US005504987A

United States Patent [19]

Bergkvist et al.

[11] Patent Number: 5,504,987

[45] Date of Patent: Apr. 9, 1996

[54] DEVICE FOR MANUFACTURING A SCREENING BODY

[75] Inventors: Lennart Bergkvist, Forshaga; Jan G. Carlsson, Karlstad; Sören Söderqvist, Karlstad; Per Toreld, Karlstad, all of Sweden

[73] Assignee: Kvaerner Pulping Technologies, AB, Karlstad, Sweden

[21] Appl. No.: 215,762

[22] Filed: Mar. 22, 1994

[30] Foreign Application Priority Data

Apr. 21, 1993 [SE] Sweden .................................. 9301303

[51] Int. Cl.$^{6}$ ..................................................... B23P 19/00

[52] U.S. Cl. ................................ 29/700; 27/464; 27/467; 27/281.5; 27/902; 162/251

[58] Field of Search .................................. 29/902, 163.6, 29/163.8, 428, 464, 469, 467, 515, 517, 281.5, 522.1, 700, 444; 425/182, 188, 441, 443, 466; 209/270, 271, 272, 300, 301–303, 281.5, 287, 288, 392–396, 404–406, 409–410, 464, 467; 210/232, 497.1, 497.01; 269/37, 43, 55, 86; 162/251

*Primary Examiner*—David L. Lacey
*Assistant Examiner*—Calvin Padgett
*Attorney, Agent, or Firm*—Cushman Darby & Cushman

[57] ABSTRACT

A screening body for a pulp digester includes two, spaced apart ring supporting a plurality of axially extending screening bars each of which has a foot portion frictionally received in and welded to a correspondingly formed recess formed on the inner side of each of the ring segments; an apparatus for manufacturing a screening body is also provided and which includes a first assembly member which mounts a form for receiving the ring member segments in parallel relation and into which are inserted the screening bars with the foot portions fractionally received in complementary recesses formed on the inner side of each of the ring segments; a retaining member in the form of a second assembly device includes a cylindrical drum surface which is pressed against the screening bars of a partially assembled screening body section while a second and subsequent sections of the screening body are assembled.

7 Claims, 7 Drawing Sheets

DEVICE FOR MANUFACTURING A SCREENING BODY

FIELD OF THE INVENTION

The present invention relates to a screening structure for a treatment vessel for treating wood chips, the structure comprising a screening body surrounding or enclosing a cylindrical space typically with a pumping screw rotating therein. The screening body includes a plurality of axial screening bars and a plurality of support rings spaced from each other, which surround the screening bars and are connected thereto. The invention also relates to a method and a device for manufacturing the screening body of such a screening structure.

BACKGROUND OF THE INVENTION

A commonly used screening body for the top screen of a treatment vessel consists of a plurality of screening bars held together to form a cylinder. Each screening bar has a relatively slight cross-sectional area, about 40 $mm^2$ (the greatest width being about 4.8 mm and the smallest about 2 mm), and a low section modulus $W_y$ namely below 20 $mm^3$. A plurality of wires run through transverse holes in the waist portion of the screening bars and the screening bars are surrounded by flat support rings arranged at the same levels as the wires in order to anchor the screening bars to the support rings via said wires. A special connecting element is firmly joined to the radially inner part of each support ring. The connecting element consists of a metal sheet bent to U-shape, the legs of which are welded to the support ring and a cavity is formed for passage of the wire. The connecting element is further provided with radial recesses running vertically through it to receive the foot section of the screening bars. However, the support rings do not give the screening body sufficient stability against torsional stresses and one or more strips must be clamped onto the outside of the screening body, where they extend helically in order to take up torsional stresses in the screening bars during use. Even if the support rings are placed as close together as 70 mm, and several such strips are clamped helically onto the outside, the construction is still unable to withstand the torsional stresses it is subjected to during operation at the top of a pulp digester, for instance, where together with an inner screw it forms a top screen to separate out liquid from the wood chips in a transfer system. The holes in the screening bars contribute to further reduction of the bending resistance (section modulus $W_y$) of the screening bars. It is thus usual for the screening body to be deformed by the torsional stresses to which it is subjected during operation, due to the influence of the screw and the chips passing through, and also by scrap becoming caught between the screw blades and the screening bars. The entire screening body may be destroyed and must then be replaced with a new one, but even deformation of one or more screening bars will cause disturbances in operation since the screening effect is deteriorated. The known screening body is also complicated to manufacture, the screening bars having to be provided with holes for the wires, the U-shaped connecting elements having to be welded to the screen support rings, special grooves for the foot sections of the screening bars having to be made in the connecting elements, the wires having to be passed alternately through the cavities in the connecting elements and the holes in the screening bars, and the strips running helically around the outside having to be applied with specific pre-stressing in order to give the desired support function. Because of the complicated construction of the screening body, it is not possible to achieve sufficiently small tolerances for the inner diameter of the screening body, which means that the pumping screw to be positioned within the top screen must be subsequently manufactured on the basis of the dimensions of the screening body to ensure a preferred clearance of about 0.5–1 mm. Also, the screening body and screw must therefore be manufactured as a pair and when the screening body must be replaced due to deformation, the screw must also be replaced with a completely new one fitting the new screening body.

SUMMARY OF THE INVENTION

The object of the present invention is to provide a screening body that is designed such that it withstands the stresses that normally occur during operation, without becoming seriously deformed, and to provide a method and a device for manufacturing screening bodies with very small and accurate tolerances so that the screening body and screw do not have to be manufactured as a pair to achieve the required clearances.

The screening means according to the invention is substantially characterized in that the support rings of the screening body are provided on their inner sides with identical, uniformly distributed radial recesses to receive foot sections of the screening bars, and that the width of each recess is adjusted to the thickness of the foot section of the screening bars so that the screening bars are received in the recesses without clearance or substantially without clearance, and that the screening bars are permanently connected to the support rings by means of welding.

The method according to the invention is substantially characterized in that the support ring segments are placed a predetermined distance from each other in a first assembly fixture across a plurality of elongate parallel positioning members which, with the aid of locking means, are detachably connected to a first group of arc-shaped connecting segments situated at the ends of the positioning members, the support ring segments being simultaneously clamped at a predetermined distance from each other and in aligned positions, after which screening bars are placed in the recesses of the support ring segments, parallel to each other, to form a first screening body section, that the first assembly fixture with the screening body section assembled therein is secured by its connecting segments at the opposite end sections of a drum of a second assembly fixture, said drum having an axially split shell plate which, prior to said securing, has been adjusted by an adjusting member to alter the circumference so that the shell surface is adjusted to a circular shape with a radius that is constant in all cross sections of the drum, that said locking means are loosened so that the engagement of the positioning members with the support ring segments and with the connecting segments is released, after which the positioning members are removed to be combined with another group of identical connecting segments to re-establish said first assembly fixture while the first group of connecting segments retains the screening body section at the shell plate, that screening bars distributed around the entire drum by repeating said steps, are surrounded by annular clamping means so that the screening bars are pressed against the shell plate and facing ends of the support ring segments are brought into contact with each other, and that the support ring segments thus fixed are welded together to form unitary support rings and the screening bars are welded to the support rings at least at a majority of contact points.

The assembly device according to the invention includes a first assembly fixture with a plurality of elongate parallel positioning members for the support ring segments, two arc-shaped connecting segments disposed at the ends of the positioning members, the positioning members comprising locking means arranged to detachably connect the connecting segments and the positioning members together while simultaneously clamping the support ring segments at a predetermined distance from each other and in aligned positions to receive the screening bars in the recesses to form a first screening body section. A second assembly fixture comprises a drum pivotally journalled about a horizontal central shaft, said drum having a surface in the form shell plate divided at at least one point by an axially extending gap; adjusting members are arranged to adjust the shell plate to alter the circumference thereof so that the shell surface is adjusted in various operative shapes including a circular shape with a radius that is constant in all cross sections of the drum, and at least one non-circular shape; attachment means for securing the first assembly fixture to the second assembly fixture via the connecting segments and end parts of the drum are provided. Annular clamping means are arranged to surround the screening bars distributed around the entire drum after the positioning members have been removed one by one from the connecting segments in order to press the screening bars against the shell plate and move the facing ends of the support ring segments into contact with each other.

The invention will be explained further in the following with reference to the drawings.

DETAILED DESCRIPTION OF THE INVENTION

Figure 1:
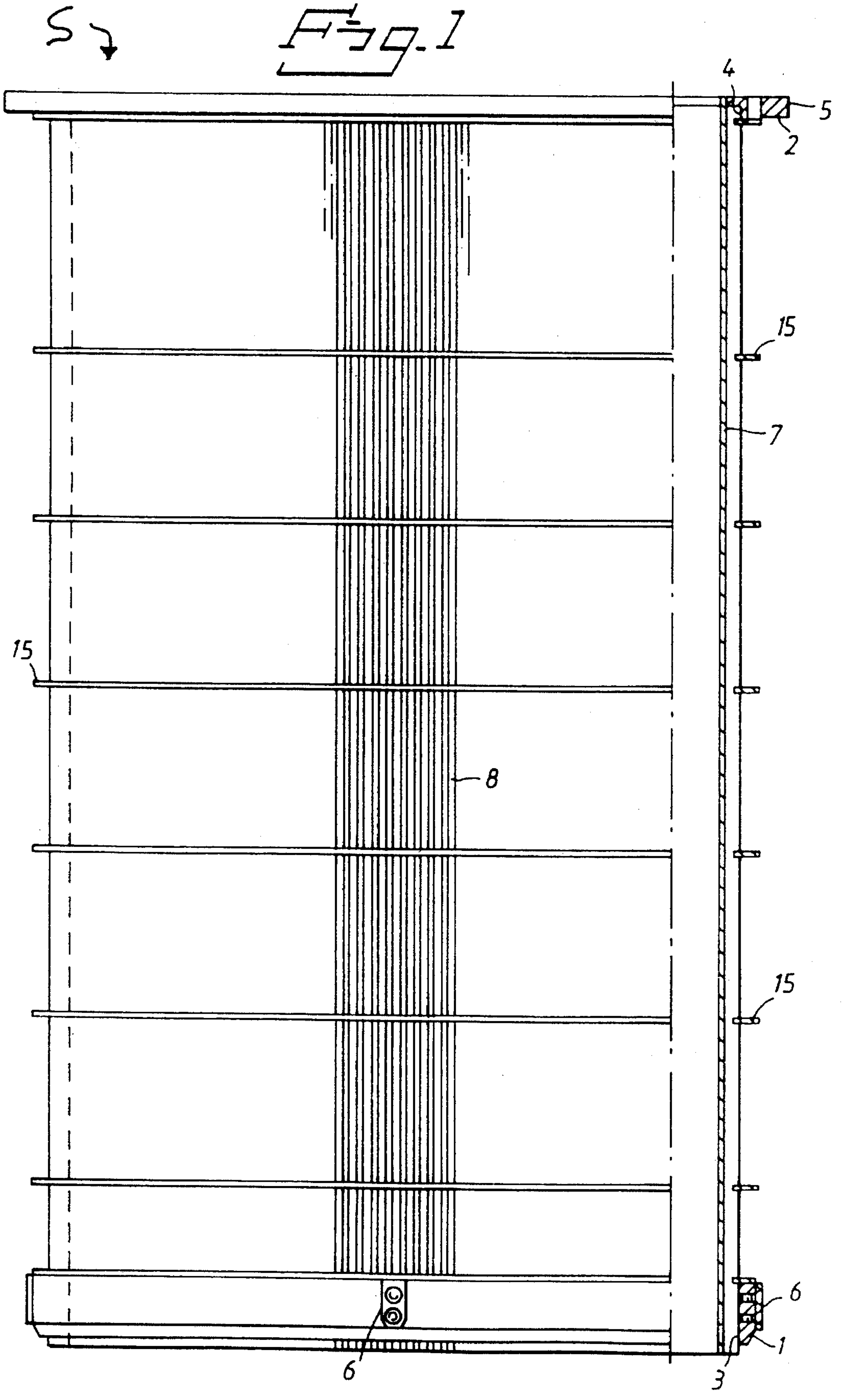
FIG. 1 is a side view of a screening body according to the invention and FIG. 1A is a schematic illustration of the screening body with a screw installed therein.
Figure 1A:
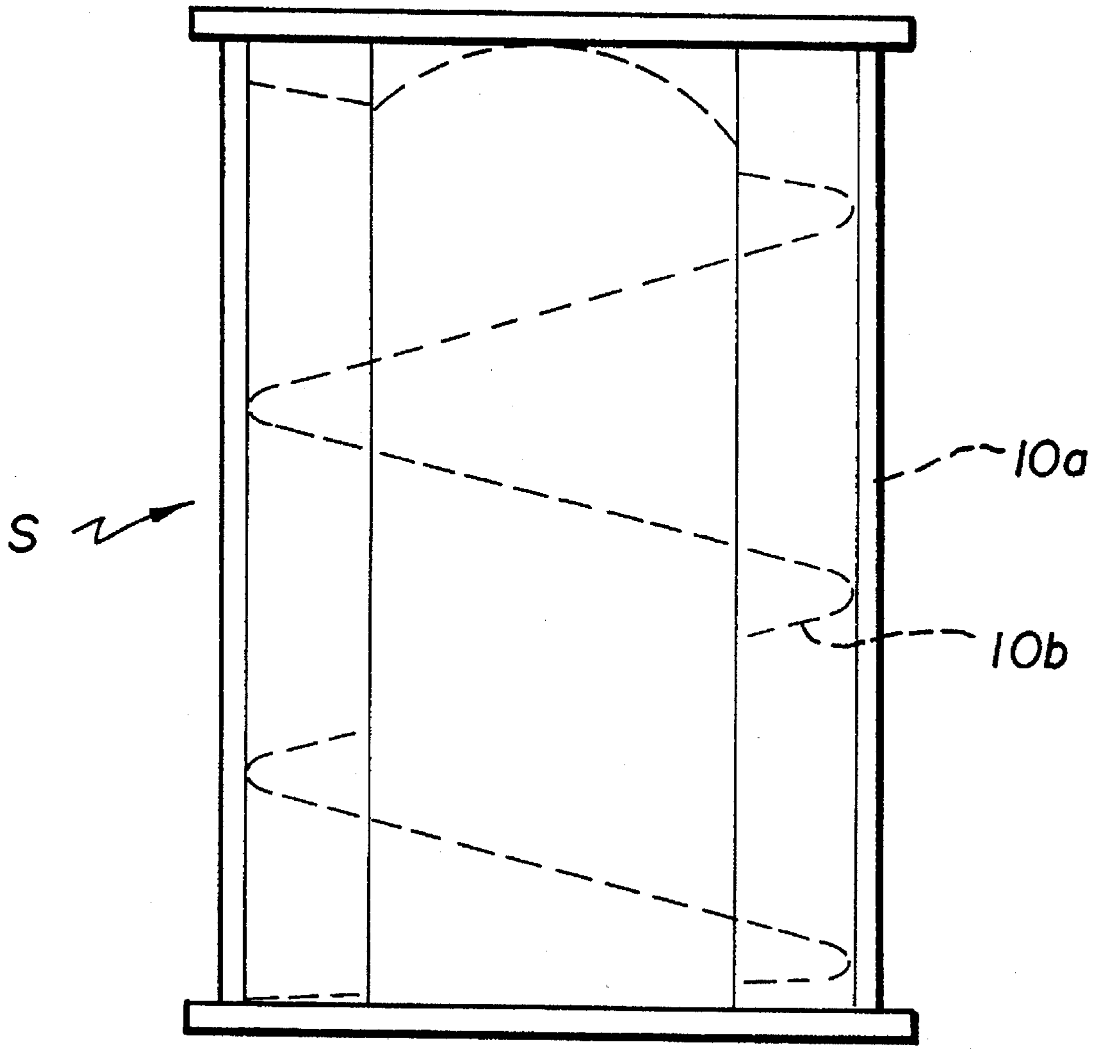
Figure 3:
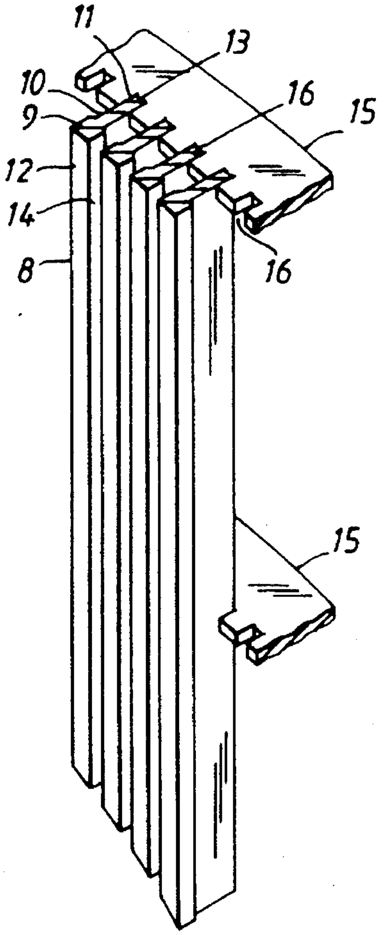
FIG. 3 is a view in perspective, sectional view of a portion of the screening body according to FIG. 1.
Figure 4:
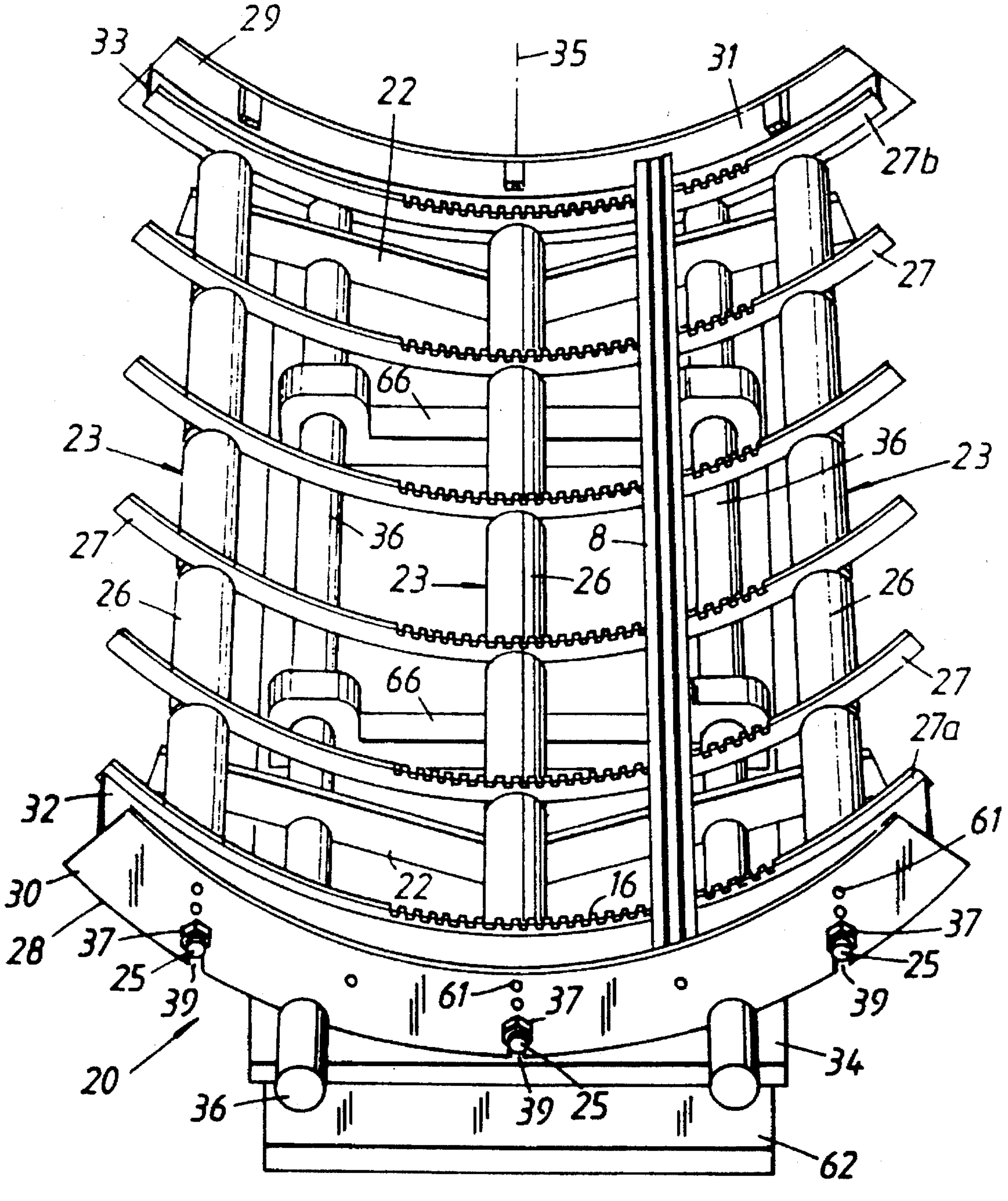
FIG. 4 is a view in perspective of a first assembly fixture of a device for manufacturing a screening body according to FIG. 1.
Figure 5:
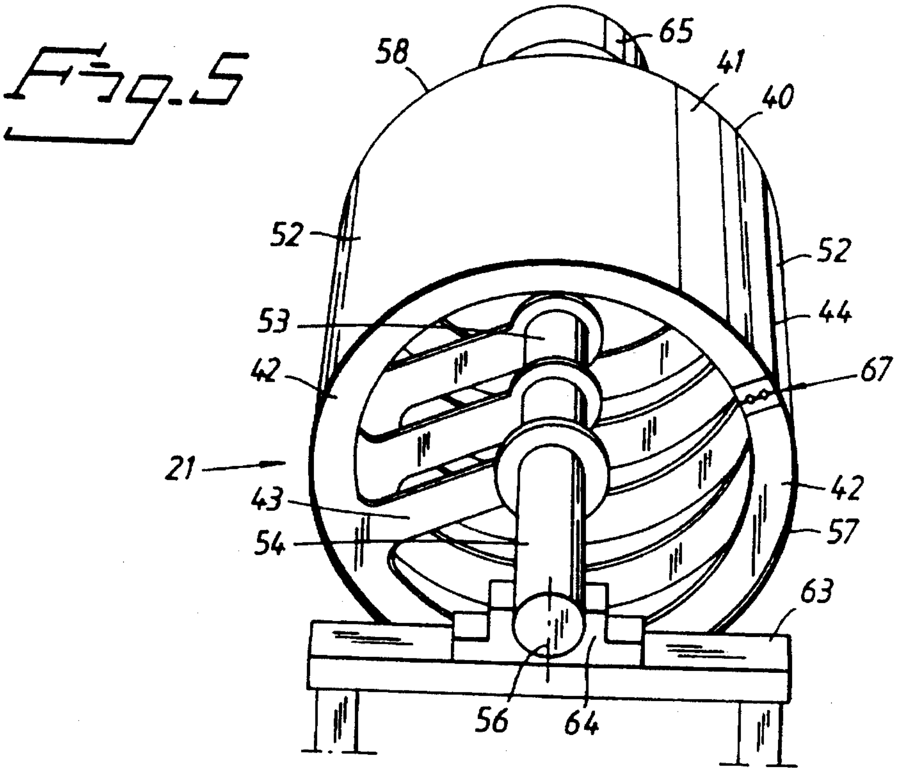
FIG. 5 is a view in perspective of a second assembly fixture of a device for manufacturing a screening body according to FIG. 1.

The screening body S shown in FIG. 1 is of the type that normally is disposed at the upper end of a digester vessel and includes a screw 10*a* disposed therein as shown schematically in FIG. 1A. The clearance between the outer periphery of the blade 10*b* of the screw 10*a* and the inner surface of the screen body S is preferably between 0.5–1.0 mm as noted above. The screening body S has a lower guide ring 1 and an upper assembly ring 2 having coaxial inner cylindrical support surfaces 3, 4 with the same diameter. The upper assembly ring 2 is provided with a radial flange 5 for mounting the screening body into the top section of a treatment vessel such as a digester or impregnation vessel. The guide ring 1 is provided on its outer side with a plurality of locking bosses 6 for receipt in axial grooves (not shown) in a centering means (not shown), disposed in the treatment vessel on a level with the lower guide ring 1 to cooperate therewith and provide centering of the lower end of the screening body inside the treatment vessel and at the same time to secure the screening body against turning via these locking bosses. The screening body also has a cylindrical screening wall 7 comprising a plurality of uniform screening bars 8 of predetermined profile or cross section. Each screening bar 8 has a head section 9 (see FIG. 3), a waist section 10, a foot section 11, an inner side 12 located at the head section 9 and an outer side 13 located at the foot section. In the embodiment shown, the inner and outer sides 12, 13 are flat and parallel to each other, and the waist section 10 and foot section 11 are of equal thickness and converge without visible distinction, whereas the head section 9 is thicker than the waist section 10 (about 10 mm and 7 mm, respectively) in order, inter alia, to provide the screening bar with increased torsional rigidity. Each screening bar 8 is welded by its outer side 13 to the lower and upper rings 1, 2. The screening bars 8 are arranged at predetermined distance from each other, forming identical screening gaps 14 (preferably about 3–5 mm) between them to drain liquid from the liquid-containing chip material fed in a downward direction through the screening body. Each screening body 8 has a section modulus $W_y$ that is greater than 100 $mm^3$, preferably greater than 150 $mm^3$. This is a measure of the bending resistance of the member.

Figure 2:
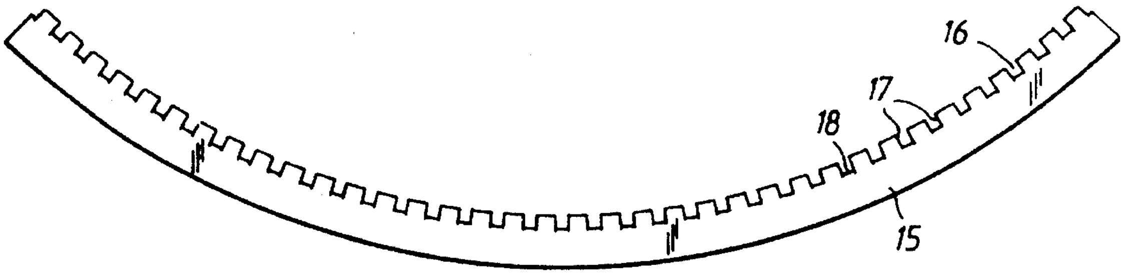
FIG. 2 is a top view of a portion of a support ring of the screening body shown in FIG. 1.

The screening wall further comprises a plurality of flat support rings 15 located between the lower and upper rings 1, 2. Seen in cross section, the greatest extension of these rings is in radial direction. Each intermediate flat support ring 15 is provided on its inner side with identical uniformly circumferentially distributed radial and vertical alignable square recesses 16 (see FIG. 2), each having parallel side walls 17 and a bottom wall 18 located perpendicular to the side walls 17 and having recessed corners with suitably small radius to prevent the formation of cracks in the material. The width of each recess 16 is such in relation to the width of the foot section 11 of a screening bar 8 such that said foot section 11 can be received in the recess 16 without clearance therebetween. These widths are preferably so close to each other that a fit is obtained that can be designated a friction fit or similar to such. More specifically, the width of each recess 16 is 0.05–0.10 mm greater than that of the foot section 11 of the adjacent screening bar 8. The flat support rings 15 are welded to all or a predetermined number of the screening bars 8. Each support ring 15 is in turn formed out of preferably four segments welded together, the segments preferably having been manufactured by means of cutting or machining with high-energy beams such as laser beams or jets of a mixture of a fluid and solid particles. Such beam/jet machining enables recesses to be produced with widths that eliminate clearance between them and the screening bars in a desired manner. In general each screening bar 8 has a greatest width exceeding 6 mm, preferably exceeding 8 mm. The foot section 11 has a width exceeding 3 mm, preferably exceeding 5 mm. As mentioned, the support rings 15 are flat, which is preferred, and have a thickness below 7 mm, preferably about 5 mm. The axial distance between two successive support rings 15 is about 100 mm. The distance preferably exceeds 150 mm and most preferably it is about 200 mm. The invention thus enables a considerably wider spacing between the support rings without their width, ie, axial thickness, having to be increased as compared with the known support rings. Fewer support rings means that the total area of the upper sides of the support rings is reduced and that deposits of chemical material and other solid material (known as "scaling") on these upper sides is correspondingly reduced, which in turn reduces the work of removing these deposits as compared with the screening body described in the introduction which requires a short distance between the support rings (70 mm). This advantage is further emphasized in that the width of the support rings can be made narrower as compared with the known support rings which have a width of 40 mm. The width of a support ring according to the invention is thus less than about 40 mm and is preferably about 30 mm.

FIGS. 4 to 9 show a device for manufacturing a screening body according to FIG. 1. The device consists of a first assembly fixture 20 shown in FIG. 4 and a second assembly fixture 21 shown in FIG. 5. The first assembly fixture 20 is disposed on a carriage 62 with a vertically movable table 34. Suitable hydraulic rams may be used to this end as will be apparent to those skilled in this art. The carriage 62 is movable along a track coinciding with the center line 35 of said assembly fixture 20. On the table 34 is a stand comprising two horizontal rods 36 spaced apart, mounted in supports 66 and located parallel to said center line 35, and two transverse, angled support arms 22 with recesses enabling them to rest freely on the rods 36. The assembly fixture 20 has three positioning members 23 located parallel with said center line 35 and resting freely, i.e. without mechanicals restraint, on the support arms 22 in recesses in these. The positioning members 23 have specific locking means which comprise an elongated set bolt 25 in the embodiment shown (see FIG. 8). The positioning members 23 also comprise a plurality of tubular spacers 26, the length of the spacers determining the distance between the support rings 15 in the finished screening body. When assembling the body, flat arcuate segments 27 of the completed support rings 15 are placed between the tubular spacers 26 so that each support ring segment 27 rests on the three set bolts 25 with its smaller radius facing up. For the sake of simplicity a number of the recesses 16 have been omitted and only a few of the screening bars 8 are shown in place. The first assembly fixture 20 also comprises two arc-shaped transverse connecting segments 28, 29, each having a flat, radially directed attachment part 30, 31 and an axially directed spacer 32, 33 secured thereto and designed to be pressed against the nearest support ring segment 27*a*, 27*b*, respectively. The attachment parts 31, 32 have opposing axial apertures through which the set bolt 25 extends to receive nuts 37, 38 acting on the outer side of the attachment part 30, 31. Each axial aperture continues into a radial recess 39 which is open radially outward so that the set bolt 25 can be removed from the connecting segments 28, 29 when the nuts 37, 38 have been loosened in a later stage of the manufacturing process. After the support ring segments 27 have been placed in the spaces between the tubular spacers 26 and between the outer tubular spacers 26a, 26b and opposing tubular spacers 32, 33, the screening bars 8 are placed in the radially facing recesses 16 of support ring segments 27 so that one end of each screening bar 8 is located close to or in surface contact with the attachment part 30 of the connecting segment 28. The support ring segments 27 are then clamped firmly between the tubular spacers 26 and the spacer parts 32, 33 by the nuts 37, 38 being tightened against the attachment parts 30, 31 and axial clamping forces thereby being transmitted from the spacer parts 32, 33. The screening bars 8 still rest freely in the recesses 16 of the support ring segments 27. With the aid of the carriage 62, the screening body section assembled in this manner is then moved together with the first assembly fixture 20 to a position immediately beneath the second assembly fixture 21 (see FIGS. 7 and 8).

Figure 6:
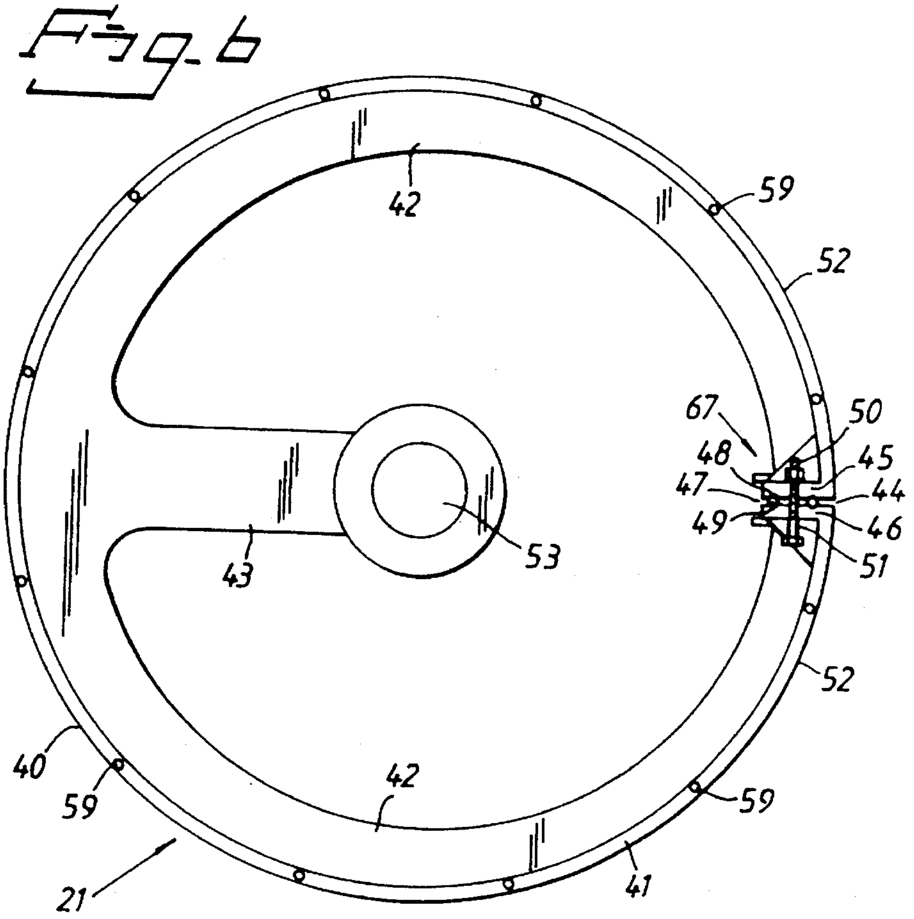
FIG. 6 is an end view of the second assembly fixture according to FIG. 5.
Figure 7:
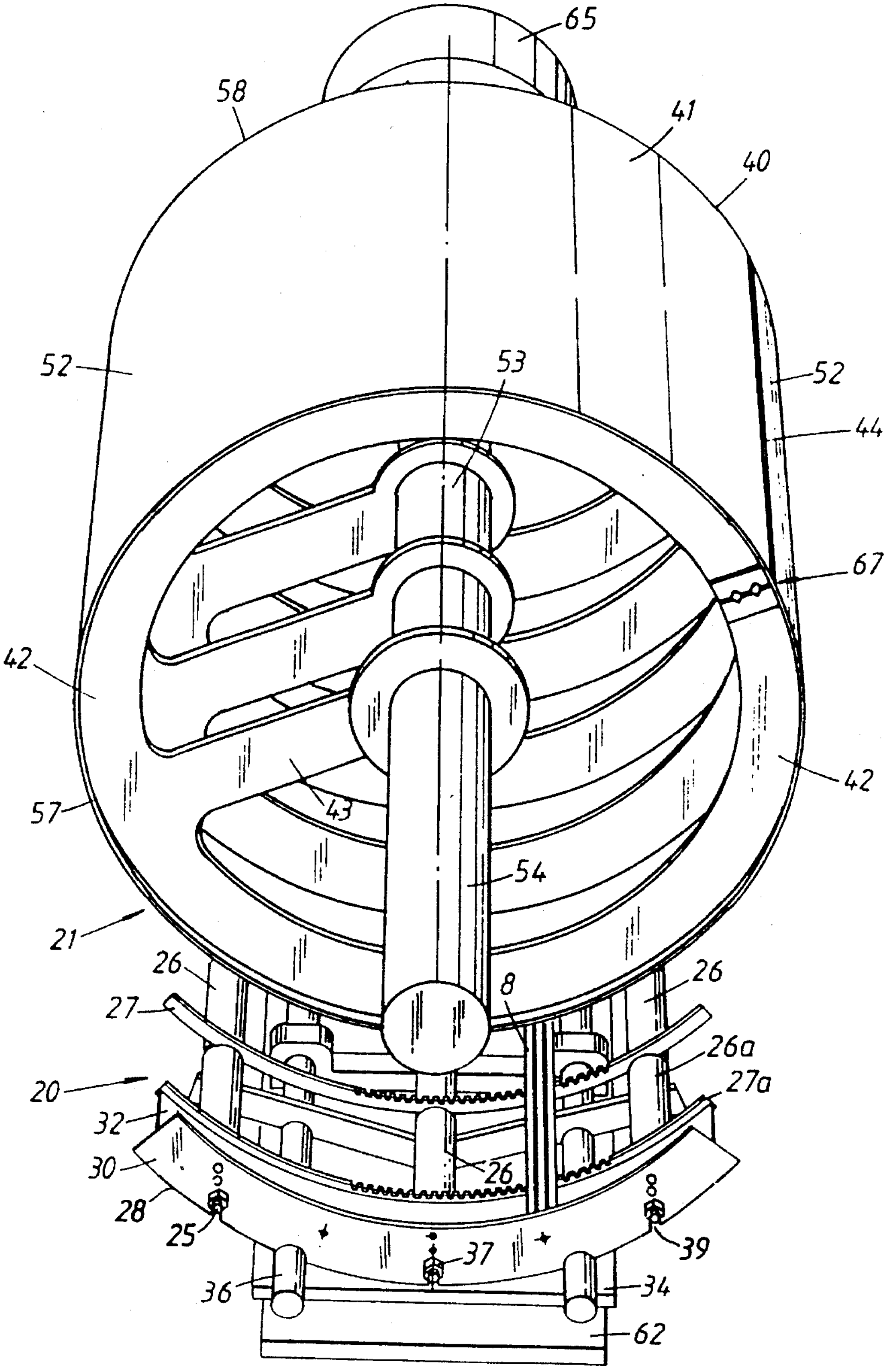
FIG. 7 is a view in perspective of parts of the two assembly fixtures and illustrates the first assembly fixture with the screening body section moved in under the second assembly fixture.
Figure 8:
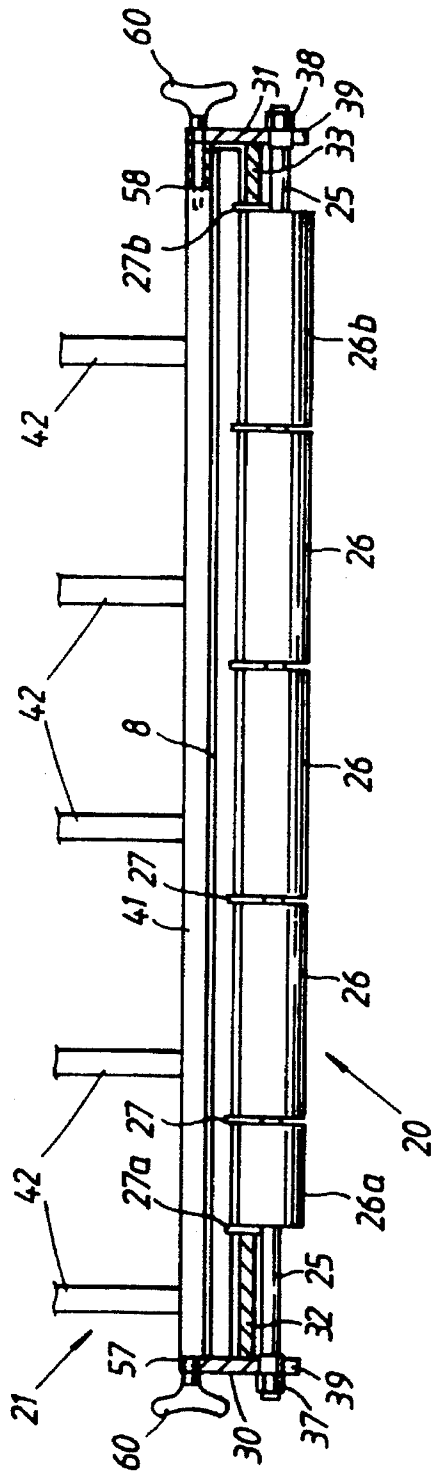
FIG. 8 is a side view of the two assembly fixtures screwed together and with a screening body section located between them.
Figure 9:
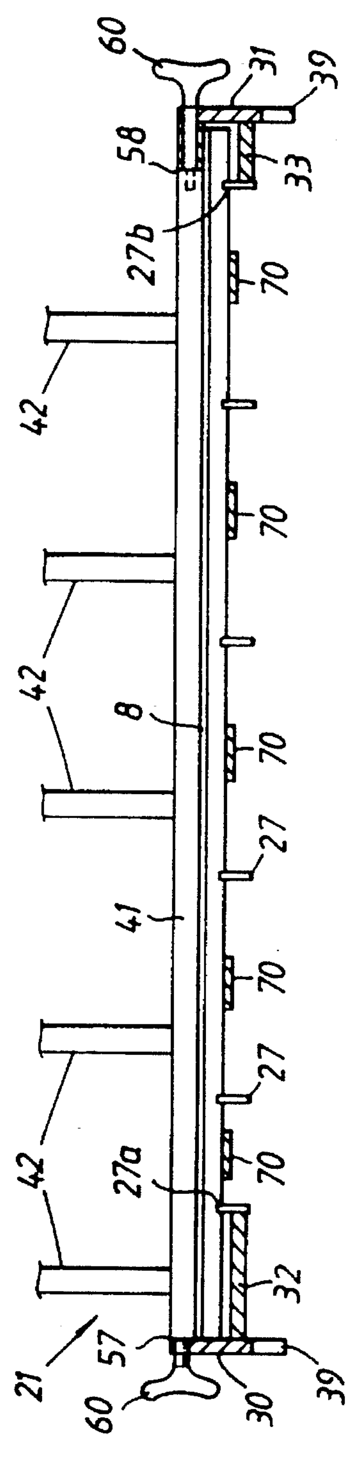
FIG. 9 is a partial side view of the second assembly with clamping means enclosing the screening body sections.

The second assembly fixture 21 (see FIGS. 5 to 9) comprises a drum 40 having a stable, bendable shell plate 41. The assembly fixture 21 also includes adjusting members 67 arranged to adjust the shell plate 41 to alter the circumference thereof so that the shell surface 52 is adjusted to various operative shapes including a circular shape with a radius that is constant in all cross sections of the drum, and at least one non-circular shape. The drum 40 has a plurality of inner, arc-shaped flat support arms 42 connected together in pairs via a radial connecting arm 43. The arms 42 of each pair extend to the diametrically opposite side of the drum 40 so that their ends are located a short, adjustable distance from each other as shown in FIGS. 6 and 7. As shown in FIG. 6, the shell plate 41 of the drum is axially cut close to the ends of the support arms 42 to form an axial gap 44. A support strip 45, 46 is firmly joined to each axial edge of the cut in the shell plate 41, the support strips 45, 46 being radially aligned as seen in their cross-section and being firmly joined each to its own group of support arms 42 at their ends so that a gap 47 is also formed between the support strips 45, 46, said gap 47 thus continuing into the outer gap 44. The facing surfaces of the support strips 45, 46 are provided with two pairs of opposing axial grooves 48 to receive and secure detachable spacer elements 49. With the aid of a number of stud bolts 50 the two support strips 45, 46 can be displaced in relation to each other in order to alter the circumference of the shell plate 41. When the spacer elements 49 are placed in the grooves 48 and clamped firmly between the support strips 45, 46 with the aid of the stud bolts 50, the surface of the shell plate 42 describes a circle the radius of which is constant in all cross sections of the drum 40. The lower support strip 46 is provided with a plurality of bolts 51, the free ends of which can be screwed out in order to act against the upper support strip 45. By loosening the stud bolts 50, the support strips 45, 46 can be pressed apart with the aid of the bolts 51 so that the shell plate 41 is enlarged to a non-circular shape, if required.

The support arms 42 are yielding in a radial direction and they have a dimension in the radial direction that decreases gradually in a predetermined manner from the connecting arms 43 to their outer ends at the gap 47. This ensures that the bending is correctly distributed along the whole support arm 42 and to an increasing extent towards the outer end so that the surface 52 of the shell plate describes an exactly circular and cylindrical shape every time said spacer element 49 is held clamped between the two support strips 45, 46.

The adjustment means 67 for adjusting the shell plate 41 so that its circumference is altered and the surface 52 adjusted to different operative shapes may consist of pneumatic or hydraulic control means instead of the screw members 50, 51, in order to achieve the desired adjustment of the shape of the shell plate.

The drum 40 has a shaft 53 running through it, coaxially with the longitudinal axis of the drum and to which the radial connecting arms 43 are secured. The shaft 53 is provided with shaft extensions 54 which rest on stand 63 via bearings 64 so that the drum 40 can be turned about the axis of rotation 56 defined by the shaft 53. The drum 40 is driven by a motor 65 via the farthermost shaft extension 55 of the shaft 53.

The shell plate 41 of the drum is provided at each end surface 57, 58, located perpendicular to said axis of rotation 56, with axial screw holes 59 having constant pitch and the same pitch as the holes 61 of the connecting segments 28, 29 of the first assembly fixture 20.

When the table 34 is in position beneath the drum 40, the first assembly fixture 20 with associated screening body section is raised towards the shell plate 41 by hydraulic members in the carriage 62 so that the inner sides 12 of the screening bars are close to or in surface contact with the shell surface 52. In a previous step, the spacer elements 49 have been placed between the support strips 45, 46 and clamped firmly between them so that the surface 52 of the shell plate acquires cylindrical shape. The first assembly fixture 20 is anchored to the second assembly fixture 21 with the aid of wing screws 60 which are passed through the holes 61 in the attachment parts 30, 31 of the connecting segments 28, 29 and screwed into the opposite, axial screw holes 59 in the end parts of the shell plate 41. The screw holes 59 are aligned with the holes 61 by turning the drum 40. The nuts 37 and/or 38 are thereafter loosened, thus releasing engagement with the support ring segments 15, and the set bolts 25 can be parallel-displaced to pass through the vertical recesses 39 in the attachment parts 30, 31 when the table 34 is lowered. The set bolts 25 and tubular spacers 26 will then accompany the table 34 to a lower position to be returned by the carriage 62 to the first position ready to be provided with a similar, second set of connection segments 28, 29 in preparation for the assembly of another screening body section of the same shape and size as the first one. The second screening body section is then fitted to the drum 40 with the aid of the second set of connecting segments 28, 29, after the drum has been turned a distance corresponding to the circle-arc of the screening body section, i.e. 90 in the present case. The procedure is repeated until the shell plate 41 is entirely surrounded by four identical screening body sections which can be retained in place on the shell plate 41 by means of the wing screws 60. A plurality of clamping rings 70 (see FIG. 9) are then fitted around the drum to enclose the screening bars 8 and the clamping rings 70 (each suitably in two parts) are drawn together so that they press the screening bars 8 into intimate contact with the shell surface 52 at the same time as pairs of facing end surfaces of the support ring segments 27 are brought into intimate contact with each other. This ensures that the screening body will acquire a corresponding inner cylindrical shape. The support ring segments 27 thus positioned are then welded end to end to form unitary, circular support rings 15, after which the screening bars 8 also positioned are welded to the support rings 15 in accordance with a predetermined pattern. The associated guide and assembly rings 1, 2 are then finally applied in the form of segments which are welded together to unitary rings and welded to the screening bars 8 and respective support rings 15 of the screening body. The clamping rings 70 are thereafter loosened and removed and the connecting segments 28, 29 unscrewed and removed from the shell plate 41. The stud bolts 50 are unscrewed and the support strips 45, 46 moved sufficiently far apart with the aid of the bolts 51 for the spacer elements 49 to be removed. The bolts 51 are then screwed in opposite direction so that the support strips 45, 46 can move freely towards each other due to the inherent tension in the shell plate 41 and connecting arms 43, thereby causing the shell plate to assume a non-circular shape. Thanks to the shrinkage stress in the welds, the screening body will contract substantially uniformly all round and in all cross sections, to its final internally cylindrical shape, after which one shaft extension 54 is removed from the shaft 53 while the drum 40 with screening body is lifted by a suitable lifting device and placed on its end without the shaft extension. In this position, the screening body can be lifted up with the aid of a lifting device and removed from the drum 40, possibly after the circumference of the shell surface has been further reduced with the aid of the stud bolts 50. The shrinkage stresses will cause the circumference of the screening body to decrease by about 3 mm which should be sufficient to allow the screening body to be separated from the drum 40.

Each support ring segment 27 and connecting segment 28, 29 encompass a sector angle that is a whole multiple of 360°. In the embodiment shown this sector angle is 90° and four screening body sections are thus required to enclose the drum 40.

The invention is not limited to the embodiment described above but may be varied in many ways within the scope of the claims. For instance a support ring may initially be made in one piece or welded out of two or three segments instead of the preferred four segments.

What is claimed is:

1. A device for manufacturing a screening body for a treatment vessel for treating wood chips, the screen body being of the type having a plurality of parallel extending screening bars each having an outer foot portion and a plurality of support rings with said screening bars being welded to said axially separated support rings to define a cylindrical enclosure, said support rings having recesses for receiving the foot portion of each screening bar, said device having a longitudinal axis, said device comprising a first assembly fixture including a plurality of elongated parallel positioning members for supporting arc-shaped ring segments, each of the support ring segments having a facing end and a respective axis, two arc-shaped connecting segments each located at opposite ends of said device and between which are disposed said positioning members extending along axes lying parallel to said longitudinal axis of said device, said positioning members including locking means to detachably connect said connecting segments and said positioning members together while simultaneously clamping the support ring segments at a predetermined distance from each other and in aligned positions along said respective axis to receive the screening bars in said respective recesses to form a first screening body section;

a second assembly fixture comprising a drum having a surface and a longitudinal axis and means pivotally mounting said drum for rotation about said longitudinal axis, said drum including a surface shell plate divided at at least one point by an axial gap;

said drum including an adjusting member arranged to alter the circumference of said shell plate so that said surface is adjusted in various operative shapes with a radius that is constant in all cross-sections of said drum, whereby said circumference is adjustable between a circular and a non-circular condition, said drum having opposite end portions, said device including attachment means for securing said first assembly fixture to said drum by means of said connecting segments and said end portions of said drum, annular clamping means for surrounding the screening bars after the screening bars are placed about the surface of said drum and said positioning members are removed to allow pressing of the screening bars against the shell plate of the drum and moving the facing ends of the support ring segments into contact with each other.

2. The device as claimed in claim 1, wherein said locking means of each positioning member comprises an elongated set bolt, each said positioning member comprising a plurality of tubular spacers, the length of which determines the distance between said support ring segments, said set bolt being arranged to extend through said tubular spacers and through said connecting segments and having opposite ends protruding beyond said connecting segments for engagement by respective end nuts.

3. The device as claimed in claim 1, wherein each said connecting segment comprises a radial attachment part for cooperation with said locking means and an axial spacer having an axial extension such that said spacer presses against the nearest support ring segment (33).

4. The device as claim in claim 1, wherein said axial gap is supported internally by a plurality of arc-shaped support arms, said arc-shaped support arms being connected in pairs through a radial connecting arm, said arc-shaped support arms extending about the interior of said drum and having ends separated by a gap, said adjustment means comprising two axial support strips joined to the ends of said support arms to form said gap therebetween and which extends into the gap between the ends of said shell plate surface, spacer elements being inserted between said support arms in said gap, said device further comprising a plurality of first screw members for tightening said support strips to thereby control the circumference of said drum.

5. The device as claimed in claim 4, wherein said adjusting means includes a plurality of second screw members disposed to press said support strips away from each other.

6. The device as claimed in claim 5, wherein said support arms are flexible in a radial direction and have a decreasing dimension in the radial direction from the connecting arm to their outer portions adjacent said ends thereof.

7. The device in claimed in claim 6, wherein said shell plate of said drum is provided at both ends with axial screw holes and said connecting segments are provided with axial holes to receive screw members which are positionable through said axial holes and said axial screw holes to connect said assembly fixtures together.

* * * * *